(12) United States Patent
Jespersen et al.

(10) Patent No.: US 11,054,373 B2
(45) Date of Patent: Jul. 6, 2021

(54) DUAL SCAN METHOD FOR DETECTING A FIBRE MISALIGNMENT IN AN ELONGATED STRUCTURE

(71) Applicant: LM WIND POWER US TECHNOLOGY APS, Kolding (DK)

(72) Inventors: Klavs Jespersen, Kolding (DK); Lars Nielsen, Kolding (DK); Torsten Lauridsen, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 32 days.

(21) Appl. No.: 16/616,202

(22) PCT Filed: May 22, 2018

(86) PCT No.: PCT/EP2018/063359
§ 371 (c)(1),
(2) Date: Nov. 22, 2019

(87) PCT Pub. No.: WO2018/215449
PCT Pub. Date: Nov. 29, 2018

(65) Prior Publication Data
US 2020/0158664 A1 May 21, 2020

(30) Foreign Application Priority Data
May 23, 2017 (EP) ..................................... 17172448

(51) Int. Cl.
*G01N 23/04* (2018.01)
*G01N 23/18* (2018.01)
(Continued)

(52) U.S. Cl.
CPC ............. *G01N 23/18* (2013.01); *B29C 70/30* (2013.01); *B29C 70/54* (2013.01); *G01B 11/30* (2013.01);
(Continued)

(58) Field of Classification Search
None
See application file for complete search history.

(56) References Cited

U.S. PATENT DOCUMENTS 7,050,535 B2 * 5/2006 Georgeson ........... G01N 23/083
378/21
2006/0056585 A1 * 3/2006 Georgeson ......... G01N 29/2487
378/57
(Continued)

FOREIGN PATENT DOCUMENTS

CN 101936927 A 1/2011
WO WO-2017108689 A1 * 6/2017 ............. B29C 70/30

OTHER PUBLICATIONS

Yang, et al., "Progress and trends in nondestructive testing and evaluation for wind turbine composite blade", Renewable and Sustainable Energy Reviews, vol. 60, pp. 1225-1250, 2016.
(Continued)

*Primary Examiner* — Thomas R Artman
(74) *Attorney, Agent, or Firm* — Nath, Goldberg & Meyer; Jerald L. Meyer; Tanya E. Harkins (57) ABSTRACT

The present disclosure relates to a method for detecting a fibre misalignment in an elongated structure, such as a wind turbine blade component. The elongated structure has a length along a longitudinal direction and comprises a plurality of stacked reinforcing fibre layers. The plurality of fibre layers comprises fibres having an orientation aligned, unidirectionally, substantially in the longitudinal direction. The method comprises scanning a surface of the elongated structure for identifying one or more surface irregularities, selecting one or more regions of interest comprising said one or more surface irregularities, examining said region of interest using penetrating radiation, and determining a position and/or size of the fibre misalignment based on said examining step.

17 Claims, 5 Drawing Sheets

(51) Int. Cl.
  *G01N 23/201* (2018.01)
  *B29C 70/30* (2006.01)
  *B29C 70/54* (2006.01)
  *G01B 11/30* (2006.01)
  *G01N 23/044* (2018.01)
  *G01N 23/083* (2018.01)
  *B29K 31/00* (2006.01)
  *B29K 67/00* (2006.01)
  *B29K 307/04* (2006.01)
  *B29K 309/08* (2006.01)
  *B29L 31/08* (2006.01)

(52) U.S. Cl.
  CPC ......... *G01N 23/044* (2018.02); *G01N 23/083* (2013.01); *G01N 23/201* (2013.01); *B29K 2031/00* (2013.01); *B29K 2067/00* (2013.01); *B29K 2307/04* (2013.01); *B29K 2309/08* (2013.01); *B29L 2031/085* (2013.01); *G01N 2223/054* (2013.01); *G01N 2223/1016* (2013.01); *G01N 2223/305* (2013.01); *G01N 2223/41* (2013.01); *G01N 2223/421* (2013.01); *G01N 2223/615* (2013.01); *G01N 2223/63* (2013.01); *G01N 2223/645* (2013.01); *G01N 2223/646* (2013.01)

(56) References Cited

U.S. PATENT DOCUMENTS

| 2010/0329415 | A1 | 12/2010 | Stiesdal et al. |
| 2012/0033207 | A1 | 2/2012 | Faidi et al. |
| 2016/0299085 | A1 | 10/2016 | Fisset et al. |
| 2020/0158664 | A1* | 5/2020 | Jespersen ................ B29C 70/54 |

OTHER PUBLICATIONS

Search Report dated Aug. 2, 2017 issued in corresponding European Application No. 17172448.7.

Search Opinion issued in corresponding European Application No. 17172448.7.

Search Report dated Jun. 29, 2018 issued in corresponding International Application No. PCT/EP2018/063359.

Holub, Wolfgang, et al."Detection and Evaluation of Ondulations in Glass-Fiber Reinfoced Materials"; Furth, Germany; 2012.

First Office Action dated Jan. 27, 2021 corresponding to Chinese application No. 201880049479.4.

* cited by examiner

DUAL SCAN METHOD FOR DETECTING A FIBRE MISALIGNMENT IN AN ELONGATED STRUCTURE

This is a National Phase Application filed under 35 U.S.C. 371 as a national stage of PCT/EP2018/063359, filed May 22, 2018, an application claiming the benefit of European Application No. 17172448.7, filed May 23, 2017, the content of each of which is hereby incorporated by reference in its entirety.

FIELD OF THE INVENTION

The present disclosure pertains to the field of composite structures, and more specifically to fibre misalignment in elongated structures. The present disclosure relates to a method for detecting a fibre misalignment in an elongated structure, to a method of manufacturing an elongated structure and to an elongated composite structure obtainable by said method.

BACKGROUND OF THE INVENTION

Elongated structures such as wind turbine blades, airplane wings, and vessel hulls can be manufactured using fibre reinforcing material. The fibre reinforcing material is often stacked forming a plurality of stacked layers, while aligning an orientation of the fibres with the longitudinal direction of the elongated structure in order to provide stiffness in the longitudinal direction. Alignment of the stacked fibre layers is of paramount importance for the reliability and strength of the elongated structure. Any fibre misalignment can result in a failure or breakage of the wind turbine blade. Therefore, identifying or locating a fibre misalignment or wrinkle (e.g. in-plane or out of plane misalignments) is essential to remedy the fibre misalignment and thus to ensure reliability of wind turbine blades. Knowing if there is a fibre misalignment defect in the elongated structure and being able to quantify the defect, with its location, allows to engage into appropriate repair work (such as grinding the fibre misalignment away and replacing the grinded parts) and thus eliminates excessive repair work. Furthermore, fibre misalignment detection provides a higher reliability of the manufactured wind turbine blade, while also providing enhanced safety.

Today fibre misalignments are detected by inspecting visually on the surface of the elongated structure with a flash light, and are quantified using very simple tools (such as wrinkle comb, and ruler) when a misalignment is observed. Such visual inspection is not sufficient, since it allows only detecting fibre misalignments that are present on the surface of the elongated structure. Also, such visual inspection may be time-consuming and inefficient with respect to small surface undulations that might be missed during visual inspection. Fibre misalignments that are not on the surface only, such as deeper fibre misalignment or hidden fibre misalignments are equally detrimental to the reliability of the elongated structure.

Ultrasonic testing methods have not proven sufficiently useful as a method to identify and quantify wrinkles. Ultrasonic testing methods require specific material (which may contaminate surfaces of the blades) to be added for detection of misalignment, in order to provide a contact surface between the sensor and the object under testing. Further, the sensors operate at wavelengths that do not enable appropriate detection or quantification of the wrinkles.

There is, thus, a need for solutions for detecting fibre misalignments that are not on the surface of the elongated structure, do not require additional material, and/or enable further quantification. In this respect, co-pending International patent application no. PCT/EP2016/081741 relates to a method comprising scanning an elongated structure by emitting an x-ray beam in an angle compared to the orientation of the fibres, detecting scattered rays, and determining an intensity of the detected scattered rays. While this method was found adequate in identifying deeper fibre misalignment or hidden fibre misalignments it may be time-consuming and expensive to apply it to an entire wind turbine blade structure.

US 2012/0033207 A1 relates to a system for inspecting a wind turbine blade including a scanning machine for taking images of an interior portion of the shells of the wind turbine blade, a measuring apparatus for taking numerous measurements of a defect imaged within the shells of the wind turbine blade, and a look-up table for ascertaining the theoretical strength of the wind turbine blade.

US 2010/0329415 A1 discloses a method of inspecting a quality of a wind-turbine blade, wherein the blade is inspected by a computer-tomography-method using radiation. A transmitter sends the radiation through the blade and a receiver receives the sent radiation after its passing through the blade. The position of the transmitter, of the receiver and/or of the blade is changed in relation to each other in order to perform the inspection of the blade.

SUMMARY OF THE INVENTION

It is an object of the present disclosure to provide a method for detecting fibre misalignment which overcomes or ameliorates at least one of the disadvantages of the prior art or which provides a useful alternative.

In particular, it is an object of the present invention to provide such method which is less time-consuming, more cost-effective and/or more targeted than known methods.

Thus, the present invention relates to a method for detecting a fibre misalignment in an elongated structure, such as a wind turbine blade component, having a length along a longitudinal direction and comprising a plurality of stacked reinforcing fibre layers, wherein the plurality of fibre layers comprises fibres having an orientation aligned substantially unidirectionally in the longitudinal direction, wherein the method comprises the steps of:
  a) scanning a surface of the elongated structure for identifying one or more surface irregularities,
  b) selecting one or more regions of interest comprising said one or more surface irregularities,
  c) examining said region of interest using penetrating radiation, and
  d) determining a position and/or size of the fibre misalignment based on said examining step.

It was found that the above-described method provides a targeted and efficient approach to detecting a fibre misalignment, in particular in wind turbine blades or components thereof. Rather than performing a full, penetrating scan on the entire structure, the initial surface scanning step enables a rapid and cost-effective way of identifying one or more regions of interest which have an increased likelihood of fibre misalignment, in particular fibre misalignments which have their origin deeper in the structure underneath the surface.

The subsequent examination step using penetrating radiation has the further advantage that a fibre misalignment below the surface can be detected without having to destroy the elongated structure. This leads to savings in terms of repair time and cost. The present disclosure allows detecting and locating the fibre misalignment in the depth of the elongated structure and thus eases the possible repair work. Once the fibre misalignment is located, the fibre misalignment can be repaired, which results in a clear reduction of such defects in the elongated structure. When the elongated structure is a wind turbine blade, this reduces the likelihood of failures and thus improves significantly the reliability of the wind turbine blade.

Preferably, the elongated structure is a wind turbine blade or a component thereof. The surface scanning step a) may be carried out by any suitable technology for identifying surface irregularities. Preferably, step a) comprises optically scanning the surface, preferably for creating a three-dimensional (3D) image of the surface. Thus, step a) may involve a three dimensional (3D) optical measurement, optionally comprising using a topometric measurement method. It is preferred that said optically scanning the surface is carried out using a laser. Said 3D optical measurement may involve the use of visible light, such as blue light (wavelength of 450-500 nm, such as 460-490 nm), or laser light. Advantageously, step a) is carried out using one or more cameras, such as two cameras. In a preferred embodiment, step a) is carried out using non-penetrating radiation such as visible radiation, such as visible light. Preferably, step a) is carried out using non-penetrating radiation.

It is preferred that step a) comprises recording an image of a surface of the elongated structure. It is particularly preferred that step a) uses 3D imaging, preferably wherein a light beam is directed at the surface of the elongated structure. In an advantageous embodiment, step a) comprises an image processing method including obtaining 3D image data of the surface and processing said data to create a 3D image of said surface. Preferably, said 3D image is computer generated.

Step a) is typically carried out using a device. In one embodiment, step a) is carried out using a measurement device for three-dimensional optical measurement of objects, preferably comprising a topometric sensor. Said device may include a projection unit for projecting a pattern onto a surface as well as an image recording unit for recording the pattern that is scattered back from the object. The projection unit may comprise a source for electromagnetic radiation such as visible light or laser-light radiation. The surface scan of step a) may involve three-dimensional optical capturing of a surface of the elongated structure, e.g. using optical triangulation sensors. One or more patterns may be projected onto the surface using electromagnetic radiation such as visible light or laser-light radiation. The scattered-back pattern may then be captured by one or more image recording units followed by a data processing and/or evaluation step.

Said surface of the elongated structure scanned in step a) may be a surface of a pressure side shell half or a surface of a suction side shell half, or respective parts thereof. In other embodiments, said surface may be a surface of a semi-finished pressure side shell half or of a semi-finished suction side shell half, e.g. prior to resin infusion of the fibre layers or after resin infusion but prior to curing. Step a) may be an automated step.

In a preferred embodiment, step a) involves scanning a surface of the elongated structure for identifying one or more surface irregularities exceeding a predefined threshold, said predefined threshold preferably being a surface height deviation or an orientation deviation. This predefined threshold may be a predefined deviation in height of a given point or area within the scanned surface or parts thereof with respect to the height of surrounding points or the surrounding area of that given point or area. For example, a surface irregularity may be identified as a point or an area which is at least 1 mm, at least 2 mm or at least 3 mm higher than the surrounding points or the surrounding area of that surface. In some embodiments, a surface irregularity may be identified as a point or an area which is 0.5 to 10 mm higher, such as 1 to 10 mm higher, or 2-10 mm higher, than the surrounding points or the surrounding area of that surface. In other embodiments the predefined threshold may take the form of a deviation from a predefined surface geometry. Such predefined surface geometry may be a computer-generated model and/or may be based on previous surface scans of similar surfaces, such as previous surface scans of wind turbine blades.

In some embodiments, a surface irregularity may be identified as a surface geometry deviating from an expected surface geometry by a slope or steepness with an angle of at least 0.3, at least 0.5 or at least 1 degrees, such as an angle between 0.3 and 30 degrees, such as between 0.5 and 30 degrees, such as between 1 and 30 degrees. For example, if the expected surface geometry is substantially flat, said angle is formed by said surface irregularity with an expected, substantially flat plane.

Step b) of selecting one or more regions of interest comprising said one or more surface irregularities may involve selecting said regions on the basis of one or more surface irregularities exceeding a predefined threshold, preferably a threshold of surface height deviation. A region of interest may comprise said surface irregularity as well as a surface adjoining or surrounding the same. For example, a region of interest may be a surface area comprising a surface irregularity and an adjoining surface area, such as an adjoining surface area extending at least 5 cm, 10 cm, 20 cm or 50 cm into all directions from said surface irregularity. Step b) may be an automated step.

Typically, said one or more regions of interest comprise only part of the surface of the elongated structure scanned in step a). In some embodiments, a region of interest comprises 90% or less, such as 75% or less, 50% or less, or 25% or less of the surface of the elongated structure scanned in step a).

The purpose of step c) is to identify any underlying fibre misalignment within the elongated structure that has potentially resulted in the detected surface irregularity. Step c) may involve an X-ray scan of said region of interest. Step c) may, for example, comprise scanning the region of interest of the elongated structure along at least a part of the length by emitting an x-ray beam in one or multiple angles compared to the orientation of the fibres. Step c) may further comprise detecting scattered rays, and determining an intensity of the detected scattered rays. In other embodiments, step c) involves a full or partial tomography of the region of interest, for example using X-ray radiation. Step c) may be an automated step.

Step d) of determining a position and/or size of the fibre misalignment based on said examining step may involve determining a depth position of the fibre misalignment and/or a type of the misalignment. In other embodiments, step d) may involve determining fibre layer or ply positions and/or quantities or the quality of chamfered parts. Step d) may be an automated step.

In another aspect, the present invention relates to a method of manufacturing an elongated composite structure of a fibre composite material comprising reinforcement-fibres embedded in a polymer matrix by use of a mould having a length along a longitudinal direction, wherein the method comprises the steps of i) stacking a plurality of fibre layers in the mould, wherein the plurality of fibre layers comprises fibres having an orientation aligned substantially unidirectionally in the longitudinal direction ii) supplying liquid resin to the fibre layers, and iii) curing the resin in order to provide the elongated composite structure, characterized in that the method comprises the steps of detecting (out-of-plane) fibre misalignments by use any of the above-described steps.

In another aspect, the present invention relates to an elongated composite structure obtainable by said method. Preferably, the elongated composite structure is a wind turbine blade or a component thereof.

It is clear that the aforementioned aspects of the invention may be combined in any way and are linked by the common aspect of detecting fibre misalignment in an elongated structure.

It is noted that advantages enunciated with respect to the method of detecting fibre misalignment also apply to the method of manufacturing an elongated composite structure.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

As stated in the background, there is a need for a method for detecting fibre misalignments, such as identifying hidden (below the surface) fibre misalignments in an efficient and non-destructive manner. The invention relates to a method for detecting a fibre misalignment in an elongated structure, such as a wind turbine blade component, an airplane wing, or a vessel hulls. The invention is particularly suited for large elongated structures where a non-destructive inspection is highly valued due to the costs occurred by a destructive inspection. Accordingly, the invention preferably relates to wind turbine blades as well as intermediary elongated structures having a total length of at least 30 metres, 40 metres, 45 metres, or 50 metres and/or a thickness of 1-80 mm. Accordingly, the invention preferably relates to wind turbine blades comprising materials having different densities so that x-ray radiation can reveal misalignments.

Fibre misalignment refers herein to a misalignment between two or more fibre layers, which can represent a deviation from the fibre plane such as an out-of-plane misalignment or a deviation within the fibre plan in transverse manner, such as an in-plane misalignment. In-plane misalignments are theoretically just as severe as the out-of-plane misalignments, but much more unlikely. The in-plane misalignments are reduced and remedied mostly by the construction of the material layer constituting the fibre layers. However, in-plane misalignments don't affect multiple plies as the out-of-plane misalignments do. Examples of fibre misalignments are folds, undulations, wrinkles or crumples.

In a preferred embodiment, the above-described method for detecting a fibre misalignment in an elongated structure further comprises the steps of:

a') scanning the elongated structure along at least a part of the length using an incident X-ray beam having a single angle of incidence for identifying one or more structural irregularities, b') selecting one or more regions of interest comprising said one or more structural irregularities, wherein steps a') and b') are carried out prior to steps c) and d).

It was found that such additional screening of steps a') and b') enables a quick and efficient identification of potentially problematic regions of interest by identifying structural irregularities, which might be present a few millimeters below the surface, such as 1-20 mm, 1-10 mm or 1-5 mm below the surface. Steps a') and b') may be carried out before, after or simultaneously with steps a) and b). The regions of interest selected in step b) may be the same or different than the regions of interest selected in step b'). Structural irregularities may comprise fibre misalignments.

Phrased differently, in a preferred embodiment, the above-described method for detecting a fibre misalignment in an elongated structure further comprises the steps of a') scanning the region of interest by emitting an x-ray beam in single angle compared to the orientation of the fibres, detecting scattered rays, and determining an intensity of the detected scattered rays for identifying one or more structural irregularities based on the determined intensity, and b') selecting one or more regions of interest comprising said one or more structural irregularities, wherein steps a') and b') are carried out prior to steps c) and d).

Surface irregularities may involve any surface structure which is elevated or depressed relative to the adjoining or surrounding surface, such as one or more undulations, wavelike bends, humps, curves, dents, depressions and/or elevations. A surface irregularity may extend into, or below, the curved or planar surface of the elongated structure. Also, a surface irregularity may extend above the curved or planar surface.

In a preferred embodiment, step a) involves determining spatial variations in surface elevation and comparing said spatial variations to a predetermined threshold of spatial variation in surface elevation for identifying one or more surface irregularities exceeding said threshold. The surface elevation or surface height may be envisioned as the position of a given point in the z-direction. This dimension will typically vary across the surface, i.e. when scanning the surface in the x- and y-direction, thus resulting in spatial variations in surface elevation. If this spatial variation exceeds a predetermined threshold, e.g. if the surface elevation when moving into the x-direction varies more/quicker than an allowed predetermined threshold in that direction, a surface irregularity may be identified. The predetermined threshold may be the same for all positions and scan directions, or it may vary according to scan position and/or scan direction. In some embodiments, said predetermined threshold(s) may be derived from a computer-generated model and/or may be based on previous surface scans of similar surfaces, such as previous surface scans of wind turbine blades.

The elongated structure has a length along a longitudinal direction and comprises a plurality of stacked reinforcing fibre layers. The plurality of stacked reinforcing fibre layers comprises fibres having an orientation aligned unidirectionally and substantially in the longitudinal direction. The longitudinal direction may be defined as the direction along the length of the elongated structure, such as from a root end of the elongated structure towards the tip end of the structure, e.g. towards a tip end of a wind turbine blade. The plurality of fibre layers is (mostly) aligned in one direction that is substantially parallel to the longitudinal direction. Thus, the fibre layers are unidirectional substantially in the longitudinal direction. A reinforcing fibre layer may substantially be composed of carbon fibres and/or glass fibres. According to an advantageous embodiment, reinforcing fibre layers comprise at least 25%, or at least 30%, or at least 35%, or at least 40%, or at least 50%, or at least 60%, or at least 70%, or at least 80%, or at least 90% carbon fibres. A reinforcing fibre layer may even be fully constituted by carbon fibres.

In one embodiment, step a) involves the use of a 3D scanning system, preferably a 3D laser scanning system, such as a hand-held 3D laser scanner.

In a preferred embodiment, the penetrating radiation of step c) is X-ray radiation. The penetrating radiation may also be neutron beams, gamma rays, sound waves, such as ultrasound, or radio waves. In one embodiment, step c) involves optical coherence tomography (OCT) scanning or x-ray scanning.

In one embodiment, step c) involves digital tomosynthesis. In another embodiment, step c) involves creating a tomosynthetic x-ray image. Thus, step c) may advantageously be carried out with an X-ray inspection system using tomosynthesis imaging techniques. In one embodiment, step a) involves scanning the surface of the elongated structure substantially along its entire length.

According to a preferred embodiment, the elongated structure is a wind turbine blade, wherein the method further comprises a step of e) numerical modelling of the effect of the position and/or size of the fibre misalignment on blade performance.

In one embodiment, step c) involves scanning the region of interest by emitting an x-ray beam in one or multiple angles compared to the orientation of the fibres, detecting scattered rays, and determining an intensity of the detected scattered rays, wherein step d) involves determining a position and/or size of the fibre misalignment based on the determined intensity. This may be achieved by, for example, moving a fibre misalignment detection apparatus (e.g. in a translation movement in a longitudinal or in a transverse direction) along at least a part of the length while emitting an x-ray beam in one or multiple angles compared to the orientation of the fibres. Preferably, the region of interest is scanned in step c) by emitting an x-ray beam in various different angles compared to the orientation of the fibres.

In one embodiment, step c) comprises scanning the region of interest by emitting an x-ray beam in an angle compared to the orientation of the fibres, such as emitting the x-ray beam towards the elongated structure in a pre-determined angle compared to the orientation of the fibres. A detector device is advantageously set up to detect backscattered or reflected x-rays. The angle is for example formed with respect to a plane indicative of the orientation of the fibres, such as a longitudinal plane substantially parallel to the longitudinal direction. The orientation of the fibres may be parallel to a surface of the elongated structure; thus, the x-ray beam may be transmitted or directed towards the surface with an angle formed with respect to the surface. When the surface is curved, the x-ray beam may be directed towards the surface with an angle formed with respect to a plane tangent to the surface. Out-of-plane and/or in-plane fibre misalignments may be detected depending on the angle and direction at which the x-rays are emitted towards the elongated structure. For example, for detecting in plane fibre misalignments scanning in an angle compared to a plane substantially orthogonal to the fibre orientation.

In a preferred embodiment, the angle is an angle between approx. 0.5 degrees and approx. 45 degrees with respect to a plane of the fibre layers, such as between approx. 0.5 and approx. 20 degrees, such as between approx. 0.5 degrees and approx. 15 degrees with respect to the plane of the fibre layers. It should be noted that the plane of the fibre layers may be curved along the structure, e.g. if the structure is a shell part for a curved or pre-bent wind turbine blade.

In other words, emitting an x-ray beam as part of step c) involves radiating the region of interest of the elongated structure with x-ray beams or exposing said region to x-ray radiation. The x-ray beam may be generated by an x-ray emitting source, e.g. an x-ray tube or an x-ray generator, which is configured to emit x-ray beams at a wavelength ranging from 0.01 to 10 nanometres, or a frequency ranging from 30 petaHertz to 30 exaHertz, or an energy level in the range of 100 eV to 300 keV. According to one or more advantageous embodiments, x-ray beam is emitted at an energy level in the range of 5 keV-300 keV. The x-ray emitting source may be operating at 100-300 kV and 25-100 µA.

Step c) may also comprise detecting scattered rays, such as rays scattered through the elongated structure and reflected by the elongated structure. For example, an x-ray emitting source projects an x-ray beam towards the elongated structure. The x-ray beam is scattered: some of the x-ray beam passes through the elongated structure; some is reflected while some is absorbed. The resulting pattern of the scanning (and the radiation) may then be ultimately detected by a detection medium such as an x-ray detector module or a backscatter detection module. In other words, detecting scattered rays may comprise detecting scattered rays and/or rays passing through. The resulting pattern of the scanning depends on the material properties of the elongated structure, such as density. For example, when the elongated structure comprises resin and a plurality of stacked reinforcing fibre layers made of carbon fibre and glass fibres, the x-rays scatter (e.g. reflects, passes through, absorbs) through resin (e.g. a polyester matrix or a vinyl ester matrix) and carbon fibres, differently than through glass fibres due to differences in electron density, and thus detecting the scattered rays provides a distinction between carbon fibres and glass fibres as glass has a different density than carbon. A misalignment of glass fibres is thereby detectable according to this disclosure and thus reveals a fibre misalignment of any of the fibres within the stacked reinforced fibre layers.

Step c) may also comprise determining an intensity of the detected scattered rays. Stated differently, the method comprises measuring the intensity of the detected scattered rays, such as a magnitude or level of the reflected ray.

Step d) may comprise determining a size of the fibre misalignment based on the determined intensity. In other words, the method may comprise determining whether a fibre misalignment to be repaired is present in the elongated structure, e.g. a non-negligible fibre misalignment is present in the elongated structure. In some embodiments, the step of determining a size of the fibre misalignment based on the determined intensity comprises determining a size of an out of plane fibre misalignment. A size of the fibre misalignment refers herein to a quantifying metric characterizing the misalignment, such as a height of the misalignment, a deviation angle of the misalignment with respect to the aligned fibres, and/or a location of the misalignment in the thickness of the elongated structure.

In one embodiment, the step of determining the size of the fibre misalignment based on the determined intensity comprises determining whether the determined intensity is above an intensity threshold, and when it is determined that the determined intensity is above an intensity threshold, then the fibre misalignment for repair is detected. When it is not determined that the determined intensity is above an intensity threshold, the fibre misalignment is considered negligible or inexistent. For example, when the determined intensity or the intensity difference in terms of photon counts is above a threshold showing a non-negligible deviation, the fibre misalignment is detected, and located for repair. According to some aspects of this disclosure, the method further comprises locating the fibre misalignment within the elongated structure so as to enable repair. Locating the fibre misalignment comprises for example determining at which depth (e.g. mm or number of layers/plies) from the surface the fibre misalignment is located, and/or locating a position of the fibre misalignment in the length of the elongated structured, such as distance from two edges of the elongated structured. The x-ray radiation depends on the number of x-ray detector modules involves, the exposure time (i.e. time spent on radiating a given surface), and the energy level of the radiation. It may thus be envisaged that the elongated structured is first radiated or scanned with a low anode voltage (e.g. 150 kV anode voltage) over a shorter time period (e.g. 1 h for the entire elongated structure) to reveal misalignments of a certain size (e.g. 3 degrees) and is then radiated or scanned with a higher energy spectrum (e.g. 225 kV anode voltage) over a longer time period (e.g. more than 1 h for the entire elongated structure) to further characterise the depth, and size of the same misalignments. The higher energy level may not exceed a certain level above which safety regulations are not complied with.

In some embodiments, said X-ray scanning of the elongated structured with a low energy level (e.g. 10-150 keV) over a shorter time period (e.g. 0.1-1 hour for the entire elongated structure) may be performed in parallel with the surface scanning of step a).

According to some embodiments, the step of determining the size of the fibre misalignment based on the determined intensity comprises determining whether the determined intensity substantially matches a pre-determined intensity level corresponding to a type of fibre misalignment, and when it is determined that the determined intensity is matches substantially a pre-determined intensity level, then categorizing the fibre misalignment in the corresponding type. A type of fibre misalignment is characterized for example by its size that is detectable using a characterizing energy level (or energy range) and exposure time (or exposure time range). When it is not determined that the determined intensity substantially matches a pre-determined intensity level corresponding to a type of fibre misalignment, the fibre misalignment is not categorized and is probably negligible. The pre-determined intensity level comprises a signature characterizing a fibre misalignment in terms of angle, depth, geometry or number of plies.

According to another embodiment, step c) further involves scanning the region of interest by emitting an additional x-ray beam in an additional angle. The additional x-ray beam may for instance be directed in a reverse direction of a first x-ray beam (e.g. at an additional angle of 180-α, α being the first angle). This has the advantage that the detecting method may simultaneously detect both positive and negative angles out-of-plane misalignments or undulations. It is of course also possible to carry out the scan in two steps by first carrying out a scan with the x-ray beam oriented in a first angle, and later carrying out a second scan with the x-ray beam oriented in a second angle, e.g. a reverse angle of the first angle. Additionally, or alternatively, the method further comprises scanning the elongated structure along at least a part of its length by emitting a second signal signal/ray at a plurality of angles so as to obtain a 3D representation of the fibre misalignment.

In one embodiment, step c) involves moving a fibre misalignment detection apparatus comprising an x-ray beam emitting module and an x-ray detector module along the region of interest.

In one embodiment, the angle is an angle between approx. 0.5 degrees and approx. 15 degrees with respect to the plane of the fibre layers.

In one embodiment, emitting the x-ray beam in the angle comprises emitting the x-ray beam through a collimator and/or emitting the x-ray beam with low power, such as 60 kW or less. For example, emitting the x-ray beam through a collimator involves emitting the x-ray beam along an area, a line and/or a plane defined by the collimator in order to narrow the beam, i.e. to cause direction of the beams to be more and more aligned towards a same direction. Thereby, the fibre layers are radiated along a well-defined line and plane, whereby the location of a possible fibre misalignment may be determined. The scattered signal may for instance be detected via a detector device having a pinhole, whereby x-rays scattered from a well-defined position will be emitted to a particular detector.

Emitting the x-ray beam with a lowered power comprises emitting the x-ray beam at a power equal or less than 60 kW, such as less than 40 kW, such as less than 10 kW, such as 5 kW. This allows limiting the x-ray radiation to a local area and thus renders the solution disclosed herein applicable with a proper shield or protection to reduce absorption by body tissue in the vicinity.

In one embodiment, step a) is carried out before and/or after an infusion phase where resin is infused on fibre material forming the elongated structure, before and/or after a curing phase. Also, step c) may be carried out before and/or after an infusion phase before and/or after a curing phase. The infusion phase corresponds to a phase where resin is infused on fibre layers forming the elongated structure. The curing phase corresponds to a phase after infusion, where the infused fibre layers harden.

In one embodiment, the plurality of stacked reinforcing fibre layers comprises carbon fibre layers, or carbon fibre layers and glass fibre layers. When the plurality of stacked reinforcing fibre layers comprises carbon fibre layers and glass fibre layers, determining the size of the fibre misalignment comprises determining the size of glass fibre misalignment. As carbon fibre layers are not easy to distinguish from resin after infusion by x-ray radiation and the carbon fibre layers are aligned with glass fibre layers, glass fibres are one of the medium that can then help in estimating the size of the fibre misalignment of any kind.

In one embodiment, the plurality of stacked reinforcing fibre layers comprises carbon fibre layers with a tracer yarn. For example, in parts of the elongated structures that are made of carbon and resin, the x-ray scanning does not permit to identify misalignments. However, a tracer yarn incorporated in the plurality of stacked reinforcing fibre layers enables detecting and estimating the misalignments. The tracer yarn may be made of any of material having a density substantially different than the density of the carbon or resin. For example, the tracer yarn may comprise glass. The tracer yarn may have a diameter that matches a diameter of a carbon fibre.

In one or more embodiments of the present disclosure, the plurality of stacked reinforcing fibre layers comprises one to 80 layers, such as up to 60 layers, such as up to 30 layers. The plurality of stacked reinforcing fibre layers may have a total thickness of 1 to 80 mm, such as 1 to 60 mm, such as 1 to 30 mm.

According to one embodiment, the elongated structure is a wind turbine blade component, wherein the wind turbine blade component is a load-carrying structure, such as a main laminate or a spar cap of the wind turbine blade.

In one or more embodiments of the present disclosure, the method comprises storing scans of the elongated structure in relation to a position (of the scanned fibre layers or the x-ray system) in order to provide an overall picture of the elongated structure and possible locations of fibre misalignments.

In another aspect, the present invention relates to a method of manufacturing an elongated composite structure of a fibre composite material comprising reinforcement-fibres embedded in a polymer matrix by use of a mould having a length along a longitudinal direction, wherein the method comprises the steps of i) stacking a plurality of fibre layers in the mould, wherein the plurality of fibre layers comprises fibres having an orientation aligned substantially unidirectionally in the longitudinal direction ii) supplying liquid resin to the fibre layers, and iii) curing the resin in order to provide the elongated composite structure, characterized in that the method comprises the steps of detecting (out-of-plane) fibre misalignments by use any of the above-described steps.

Step c) may be carried out using a fibre misalignment detection apparatus. The fibre misalignment detection apparatus comprises an x-ray beam emitting module configured to scan an elongated structure along at least a part of the length by emitting an x-ray beam in an angle compared to the longitudinal direction. The x-ray beam emitting module is for example an x-ray generator module capable of transmitting x-ray beams or signals through the elongated structure at a given angle, e.g. by using a collimator or a slit. The x-ray beam emitting module is for example configured to receive or derive an angle to be used for transmitting the x-ray beams, and to adjust the emission of the x-ray beams according to the received or derived angle, such as to adjust the collimator of the x-ray emitting module or the slit of the x-ray emitting module accordingly. The collimator supports in targeting a focus point so that an x-ray detector module is able to detect or receive scattered rays.

The fibre misalignment detection apparatus comprises an x-ray detector module configured to detect scattered rays.

The fibre misalignment detection apparatus comprises a processing module configured to: determine an intensity of the detected scattered rays; and estimate a size of the fibre misalignment based on the determined intensity. The processing module comprises for example an intensity determiner module configured to determine the intensity of the detected scattered rays and an estimator module configured to estimate a size of the fibre misalignment based on the determined intensity.

In one or more embodiments of the fibre misalignment detection apparatus, the x-ray beam emitting module comprises a collimator, and the x-ray beam emitting module is configured to scan an elongated structure along at least a part of the length by emitting an x-ray beam in an angle compared to the longitudinal direction through the collimator.

The fibre misalignment detection apparatus is configured to move along at least a part of a length of an elongated in a longitudinal direction while emitting an x-ray beam in an angle compared to the longitudinal direction through the collimator.

In another aspect, the present invention relates to a method of estimating the propagation of a surface irregularity through a plurality of stacked fibre layers of a wind turbine blade component, the method comprising, a) scanning a surface of the outermost fibre layer of the wind turbine blade component for identifying one or more surface irregularities, preferably by using a measurement device for three-dimensional optical measurement of objects, b) establishing a profile of the outermost fibre layer containing the one or more surface irregularities, c) calculating internal forces and external forces acting from above on the outermost fibre layer, d) calculating external forces acting from below on the outermost fibre layer required for force equilibrium, e) calculating a profile of the next fibre layer located beneath the outermost fibre layer based on the external forces calculated in step d), f) successively calculating a profile for each respective fibre layer of the wind turbine blade component by successively repeating steps c) to e) for each respective fibre layer.

Thus, internal forces and external forces acting from above are calculated for the next fibre layer, i.e. the second fibre layer, seen from the top of the stack, followed by calculating external forces acting from below on the second fibre layer required for force equilibrium, and calculating a profile of the next fibre layer located beneath the second fibre layer, i.e. the third fibre layer, based on the calculated external forces acting from below on the second fibre layer.

Thus, based on the calculated positions of the fibre layers and the expected load conditions of the structural component, the expected load distribution within the layered component can be computed. Based on this, expected values for various macroscopic quality parameters such as stiffness and fatigue resistance of the component may be calculated.

Typically, the above-described method comprises defining a set of boundary conditions such as the level of vacuum during resin infusion, the shape of the underlying moulding surface, and/or material characteristics such as material bending and compression stiffness. In some embodiments, the method comprises defining the boundary condition that the surface irregularity originates from a wrinkle or defect in lowermost layer of fibre stack.

Preferably, the profile the respective fibre-layer is a three-dimensional profile. The profile of step b) can be established on the basis of the surface scan performed in step a). Preferably, the fibre layers comprise fibres having an orientation aligned substantially unidirectionally in the longitudinal direction.

The method may be further combined with the additional steps of selecting one or more regions of interest comprising said one or more surface irregularities, examining said region of interest using penetrating radiation, and determining a position and/or size of the fibre misalignment based on said examining step.

In another aspect, the present invention relates to a method for detecting a fibre misalignment in an elongated structure, such as a wind turbine blade component, having a length along a longitudinal direction and comprising a plurality of stacked reinforcing fibre layers, wherein the plurality of fibre layers comprises fibres having an orientation aligned substantially unidirectionally in the longitudinal direction, wherein the method comprises the steps of:
   a) scanning a surface of the elongated structure for identifying one or more surface irregularities, using a measurement device for three-dimensional optical measurement of objects, and
   b) calculating the propagation of the surface irregularity through the plurality of stacked reinforcing fibre layers of the wind turbine blade component based on the surface scan of step a) in combination with one or more predefined boundary conditions relating to one or more characteristics of the fibre layers.

Figure 1:
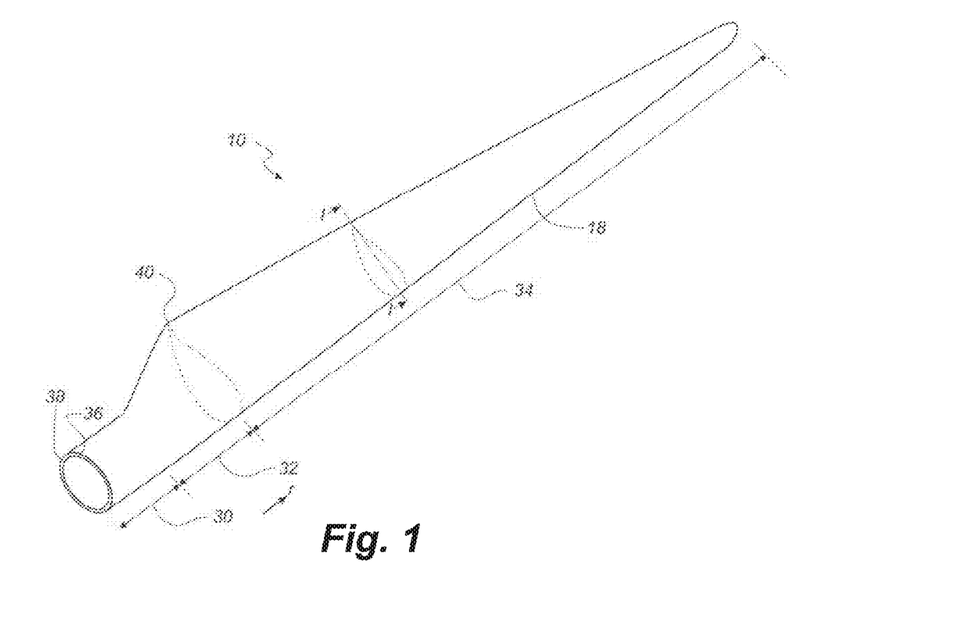
FIG. 1 is a schematic diagram illustrating an exemplary wind turbine blade according to some aspects of the invention.

FIG. 1 shows a schematic view of a wind turbine blade 10. The wind turbine blade 10 has the shape of a conventional wind turbine blade and comprises a root region 30 closest to a hub of a wind turbine, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge facing the opposite direction of the leading edge 18. The wind turbine blade 10 has a length along a longitudinal direction of the blade, indicated by the arrow illustrating distance r.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge of the blade 10. The width of the chord of the airfoil region 34 decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade.

Figure 2:
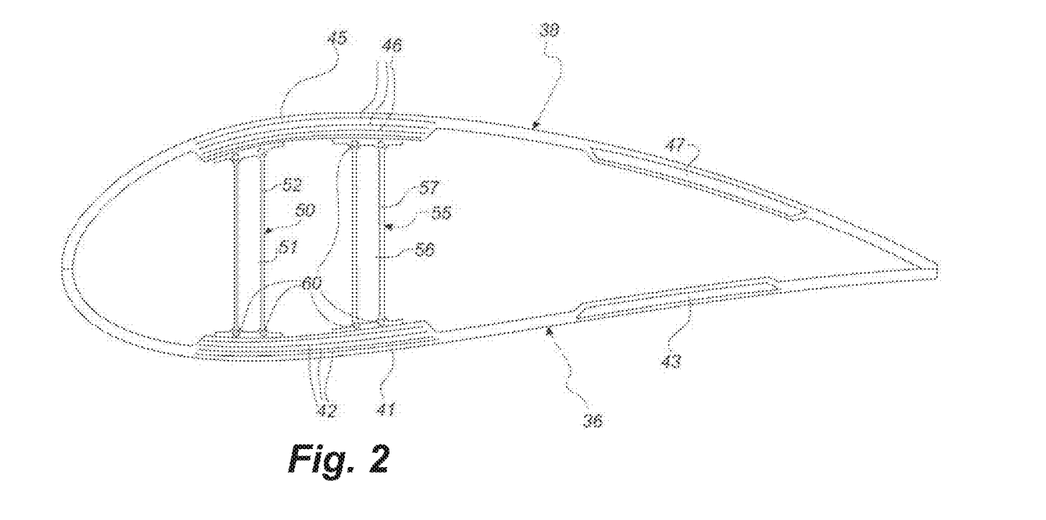
FIG. 2 is a schematic diagram illustrating an exemplary cross-section of a wind turbine blade according to some aspects of the invention.

FIG. 2 shows a schematic view of a cross section of the blade along the line I-I shown in FIG. 1. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap or main laminate is an elongated structure, such as an elongated composite structure that may form a load carrying structure of the wind turbine blade. The spar cap 41 comprises a plurality of stacked reinforcing fibre layers 42 mainly comprising unidirectional fibres aligned along the longitudinal direction of the blade in order to provide stiffness to the blade. The suction side shell part 38 also comprises a spar cap 45 (or main laminate corresponding to an elongated structure) comprising a plurality of stacked reinforcing fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the shear web body to the flanges. However, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 3:
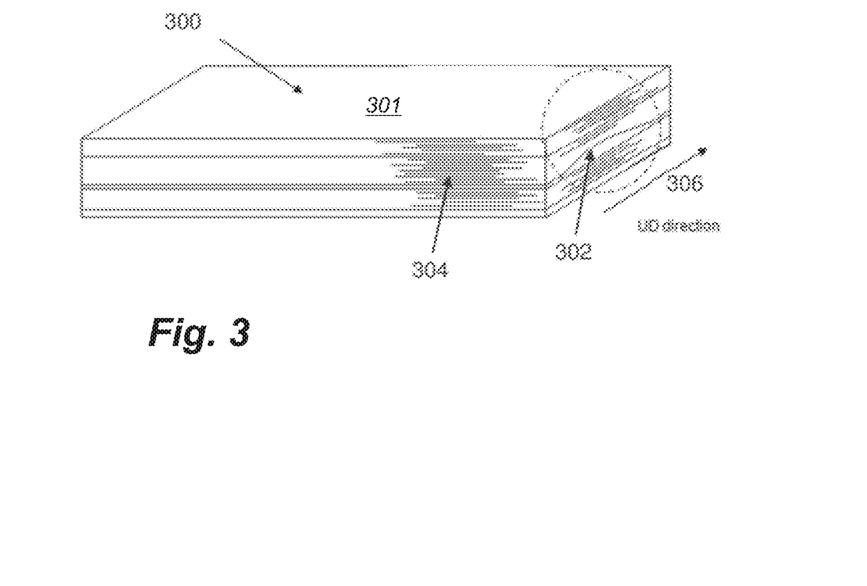
FIGS. 3-4 are schematic diagrams illustrating different views of an exemplary fibre misalignment in an exemplary elongated structure according to some aspects of the invention.
Figure 4:
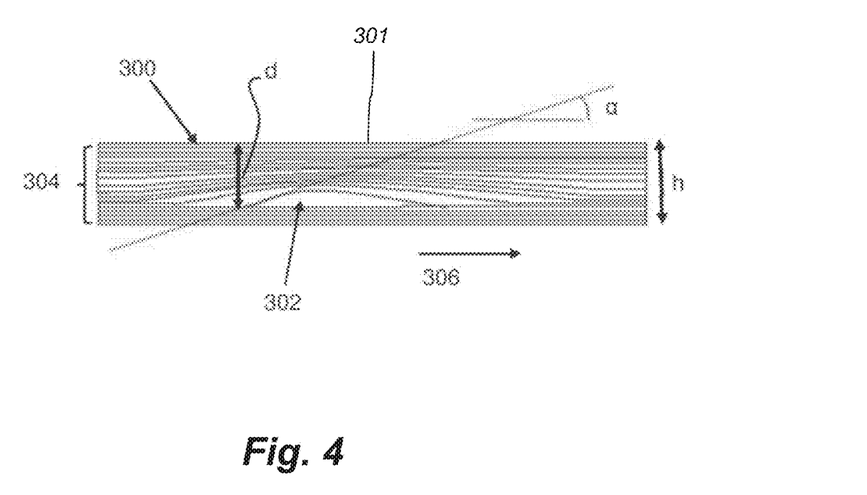

FIGS. 3-4 are schematic diagrams illustrating different views of an exemplary fibre misalignment 302 in an exemplary elongated structure 300 according to some aspects of the invention. FIG. 3 shows a perspective view of the elongated structure 300 that allows visualizing the layer construction of the elongated structure 300, including an occurrence of a fibre misalignment. The exemplary elongated structure 300 comprises a surface 301 and a plurality of stacked reinforcing fibre layers 304. The plurality of stacked reinforcing fibre layers 304 are unidirectional and orientated substantially in the longitudinal direction indicated by arrow 306. FIG. 3 illustrates an exemplary out-of-plane fibre misalignment 302 where the fibre misalignment deviates the fibre layer from a fibre plane (defined as a plane formed by most of the same fibre layer) and deforms the neighbouring fibre layers, resulting in a defect of the elongated structure.

FIG. 4 shows a cross sectional view of the exemplary fibre misalignment 302 in the exemplary elongated structure 300. The elongated structure 300 has a thickness denoted h in FIG. 4, which ranges for example from 1 mm to 80 mm or any sub-range in between. The plurality of stacked reinforcing fibre layers 304 form partly or wholly the thickness of the elongated structure at a point of interest. The plurality of stacked reinforcing fibre layers 304 are unidirectional and oriented substantially in the longitudinal direction indicated by arrow 306. The fibre misalignment 302 causes an angle α of deviation and a deformation incurred on the neighbouring fibre layers. It is advantageous to locate approximately the depth denoted d of the fibre misalignment 302 in terms of distance from the scanned surface, or a number of layers or plies from the scanned surface so as to prepare accordingly for repair. The x-ray scanning disclosed herein allows detection of the fibre misalignment 302 as well as quantification of the size of the fibre misalignment 302 that can be estimated in terms of depth d, angle α, and/or a location (e.g. a length wise position or coordinate with respect to a reference point). Optionally, the method disclosed herein using the x-ray scanning provides a signature of the fibre misalignment 302 that can be estimated in terms of geometry of the fibre misalignment 30, and/or energy absorbed, and/or reflected back by the fibre misalignment 302. For example, exposing the elongated structure to x-rays at different angles allows to identify a match between the angle at which the x-ray beam is emitted (i.e. the emission angle) and the angle α of deviation, i.e. when the emission angle and the deviation angle α are parallel the signal intensity changes significantly.

Figure 5:
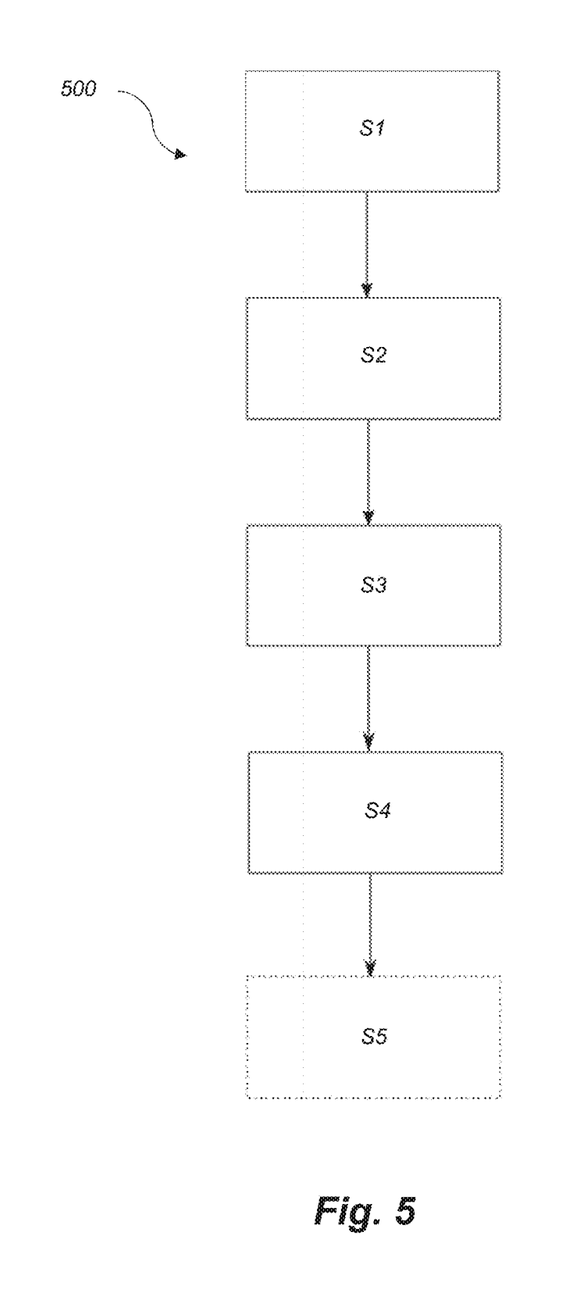
FIG. 5 is a flow-chart illustrating an exemplary method for detecting a fibre misalignment in an elongated structure according to some aspects of the invention.

FIG. 5 is a flow-chart illustrating an exemplary method 500 for detecting a fibre misalignment in an elongated structure according to some aspects of the invention. The method 500 aims at detecting a fibre misalignment in an elongated structure, such as a wind turbine blade component, an airplane wing, or a vessel hulls. The method 500 handles fibre misalignments including an out-of-plane fibre misalignment and an in-plane fibre misalignment. The elongated structure has a length along a longitudinal direction and comprises a plurality of stacked reinforcing fibre layers. The plurality of stacked reinforcing fibre layers comprises fibres having an orientation aligned unidirectionally and substantially in the longitudinal direction.

The method 500 comprises scanning S1 a surface of the elongated structure for identifying one or more surface irregularities exceeding a predefined threshold. Preferably, this step involves optically scanning the surface for creating a three-dimensional (3D) image of the surface. The method 500 further comprises selecting S2 one or more regions of interest comprising said one or more surface irregularities. In a subsequent step S3 said region of interest is examined using penetrating radiation, such as X-ray radiation. Step S3 may involve optical coherence tomography (OCT) scanning or x-ray scanning. Step S3 may also involve digital tomosynthesis of the region of interest.

The method 500 further comprises determining S4 a position and/or size of the fibre misalignment based on said examining step S3. The elongated structure may be a wind turbine blade or a component thereof. In a subsequent step S5, the method 500 may further comprise numerical modelling of the effect of the position and/or size of the fibre misalignment on blade performance.

The determination step S4 may comprise determining whether a non-negligible fibre misalignment is present in the elongated structure. It may include computing a quantifying metric characterizing the misalignment, such as a height of the misalignment, a deviation angle of the misalignment with respect to the aligned fibres, and/or a location of the misalignment in the thickness of the elongated structure. In some embodiments, it may be part of the determination step S4 to determine whether the determined intensity, e.g. of reflected X-ray radiation, is above an intensity threshold. In an illustrative example where the present technique is applicable, the intensity threshold relates to photon counting, and particularly to difference, Δ, in photon countings measured, such as deviation in photon countings measured over an area compared to the rest of the elongated structure or a perfectly or ideally aligned elongated structure. When the determined intensity is above the threshold, the fibre misalignment is detected for repair.

The determination step S4 may include determining the location of the fibre misalignment in the thickness of the stacked fibre layers by comparing the intensity of the scattered rays from aligned fibres just before the misalignment, and the intensity of the scattered rays from misaligned fibres at different angles. Locating the fibre misalignment may comprise determining at which depth (e.g. mm or number of layers/plies) from the surface the fibre misalignment is located and/or at which position along the length of the elongated structure. Referring to FIG. 4, said locating may comprise computing the depth d.

According to some aspects of this disclosure, the step of determining S4 the size of the fibre misalignment based on the determined intensity comprises determining whether the determined intensity substantially matches a pre-determined intensity level corresponding to a type of fibre misalignment, and when it is determined that the determined intensity is matches substantially a pre-determined intensity level, then categorizing the fibre misalignment in the corresponding type. When it is not determined that the determined intensity substantially matches a pre-determined intensity level corresponding to a type of fibre misalignment, the fibre misalignment is not categorized and is probably negligible or unknown. The pre-determined intensity level may comprise a signature characterizing a fibre misalignment in terms of angle, depth, geometry number of plies, a partial tomography etc. In an illustrative example where the disclosed invention is applicable, a pre-determined intensity level of 80 keV indicates a fibre misalignment with 3 degrees.

Figure 6:
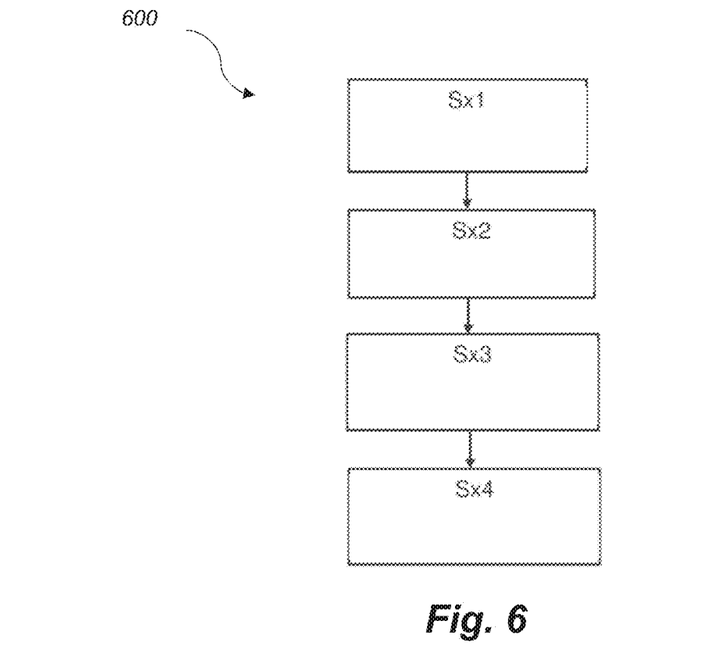
FIG. 6 is a flow-chart illustrating an exemplary method for manufacturing an elongated composite structure according to some aspects of the invention.

FIG. 6 shows a flow-chart illustrating an exemplary method 600 for manufacturing an elongated composite structure according to some aspects of the invention. The method relates to manufacturing an elongated composite structure of a fibre composite material. The fibre composite material comprises reinforcement-fibres embedded in a polymer matrix by use of a mould having a length along a longitudinal direction. The method 600 comprises the steps of:

stacking Sx1 a plurality of fibre layers in the mould, wherein the plurality of fibre layers comprises fibres having an orientation aligned substantially (unidirectional) in the longitudinal direction;

supplying Sx2 liquid resin to the fibre layers, and curing Sx3 the resin in order to provide the elongated composite structure.

The method 600 advantageously further comprises detecting Sx4 fibre misalignments by use any of the steps of method 500.

In one or more embodiments of the present disclosure, the step of scanning S1 and/or the step of examining S3 of method 500 takes place before and/or after the step of supplying Sx2 resin, or before and/or after the step of curing Sx3.

Figure 7:
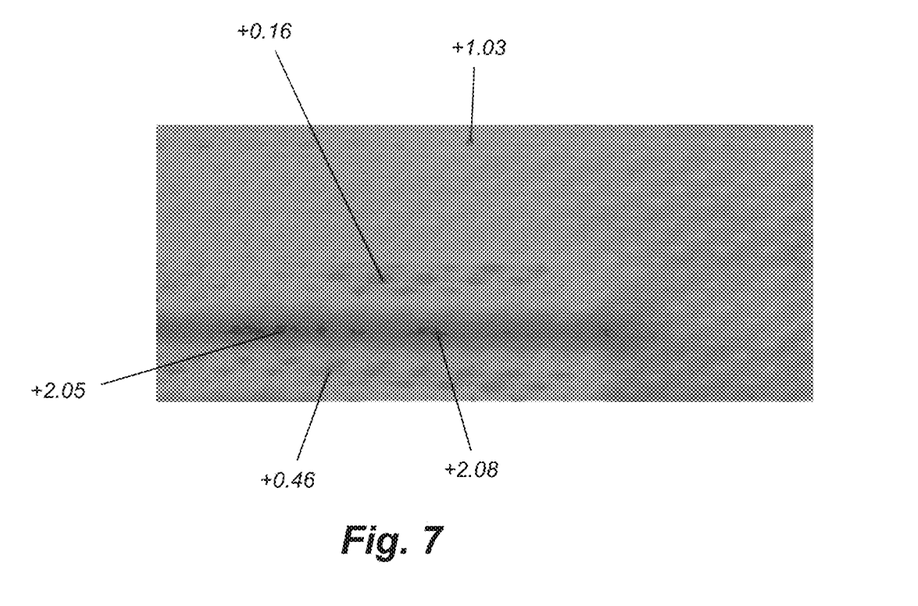
FIG. 7 is a greyscale image of a surface of an elongated composite structure scanned with a 3D optical scanning system.

FIG. 7 shows a high-resolution 3D surface image which was obtained using high resolution cameras (corresponding to step S1). Individual data points (in mm) of surface elevation above a pre-determined level are exemplified in FIG. 7. The darker area in the lower third of the image indicates a particularly elevated surface zone which might be indicative of an (underlying) fibre misalignment.

Figure 8:
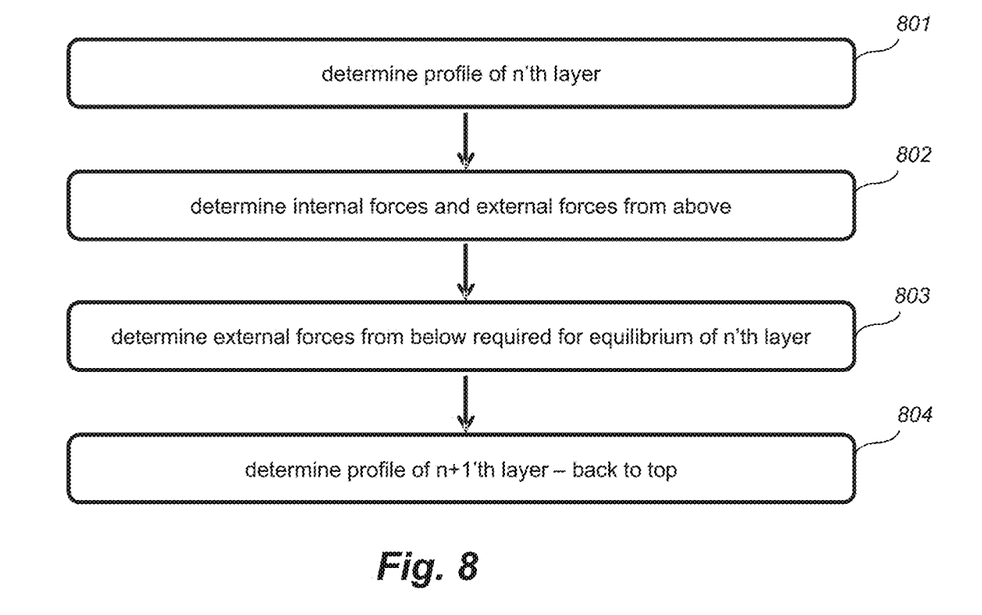
FIG. 8 is a flow-chart illustrating a method of estimating the propagation of a measured surface irregularity through a layered structure.

FIG. 8 illustrates schematically a method of estimating the propagation of a surface irregularity through a plurality of stacked fibre layers of a wind turbine blade component according to the present invention. In a first step 801, the surface of the outermost fibre layer of the component is scanned for identifying one or more surface irregularities and for establishing a profile of the outermost fibre layer containing the one or more surface irregularities. The second step 802 comprises calculating internal forces and external forces acting from above on the outermost fibre layer. In a third step 803, external forces acting from below on the outermost fibre layer required for force equilibrium are calculated, followed by calculating 804 a profile of the next fibre layer located beneath the outermost fibre layer based on the external forces calculated in step 803. This approach is successively repeated for calculating a profile for each respective fibre layer of the wind turbine blade component by successively repeating these steps for each respective fibre layer.

The invention has been described with reference to a preferred embodiment. However, the scope of the invention is not limited to the illustrated embodiment, and alterations and modifications can be carried out without deviating from the scope of the invention.

The invention claimed is:

1. A method for detecting a fibre misalignment in an elongated structure, such as a wind turbine blade component, having a length along a longitudinal direction and comprising a plurality of stacked reinforcing fibre layers, wherein the plurality of fibre layers comprises fibres having an orientation aligned substantially unidirectionally in the longitudinal direction, wherein the method comprises the steps of:

a) scanning a surface of the elongated structure for identifying one or more surface irregularities, using a measurement device for three-dimensional optical measurement of objects,     b) selecting one or more regions of interest comprising said one or more surface irregularities,     c) examining said region of interest using penetrating radiation, and     d) determining a position and/or size of the fibre misalignment based on said examining step.

2. A method according to claim 1, further comprising the steps of:

a') scanning the elongated structure along at least a part of the length using an incident X-ray beam having a single angle of incidence for identifying one or more structural irregularities,     b') selecting one or more regions of interest comprising said one or more structural irregularities, wherein steps a') and b') are carried out prior to steps c) and d).

3. A method according to claim 1, wherein step a) comprises optically scanning the surface for creating a three-dimensional (3D) image of the surface.

4. A method according to claim 1, wherein step a) involves determining spatial variations in surface elevation and comparing said spatial variations to a predetermined threshold of spatial variation in surface elevation for identifying one or more surface irregularities exceeding said threshold.

5. A method according to claim 1, wherein the penetrating radiation of step c) is X-ray radiation.

6. A method according to claim 1, wherein step c) involves digital tomosynthesis.

7. A method according to claim 1, wherein the elongated structure is a wind turbine blade and wherein the method further comprises a step of e) numerical modelling of the effect of the position and/or size of the fibre misalignment on blade performance.

8. A method according to claim 1, wherein step c) involves scanning the region of interest by emitting an x-ray beam in one or multiple angles compared to the orientation of the fibres, detecting scattered rays, and determining an intensity of the detected scattered rays, wherein step d) involves determining a position and/or size of the fibre misalignment based on the determined intensity.

9. A method according to claim 8, wherein the angle is an angle between approx. 0.5 degrees and approx. 45 degrees with respect to a plane of the fibre layers.

10. A method according to claim 8, wherein step c) further involves scanning the region of interest by emitting an additional x-ray beam in an additional angle.

11. A method according to claim 1, wherein step c) involves moving a fibre misalignment detection apparatus comprising an x-ray beam emitting module and an x-ray detector module along the region of interest.

12. A method according to claim 1, wherein step a) is carried out before and/or after an infusion phase where resin is infused on fibre material forming the elongated structure, before and/or after a curing phase.

13. A method according to claim 1, wherein the elongated structure is a wind turbine blade component, and wherein the wind turbine blade component is a load-carrying structure, such as a main laminate or a spar cap of the wind turbine blade.

14. A method according to claim 1, wherein said one or more regions of interest comprise only part of the surface of the elongated structure scanned in step a).

15. A method according to claim 1, wherein the region of interest comprises 75% or less of the surface of the elongated structure scanned in step a).

16. A method of manufacturing an elongated composite structure of a fibre composite material comprising reinforcement-fibres embedded in a polymer matrix by use of a mould having a length along a longitudinal direction, wherein the method comprises the steps of
- i) stacking a plurality of fibre layers in the mould, wherein the plurality of fibre layers comprises fibres having an orientation aligned substantially unidirectionally in the longitudinal direction
- ii) supplying liquid resin to the fibre layers, and
- iii) curing the resin in order to provide the elongated composite structure, characterized in that the method comprises the steps of detecting (out-of-plane) fibre misalignments by use of the steps in claim 1.

17. An elongated composite structure obtainable by the method of claim 16.

* * * * *